United States Patent [19]

Kanazawa

[11] 4,214,064
[45] Jul. 22, 1980

[54] PROCESS FOR PRODUCING A CASTING PLATE OF POLYMETHYL METHACRYLATE

[75] Inventor: Hiroyuki Kanazawa, Niihama, Japan

[73] Assignee: Sumitomo Chemical Company, Limited, Osaka, Japan

[21] Appl. No.: 856,019

[22] Filed: Nov. 30, 1977

Related U.S. Application Data

[63] Continuation of Ser. No. 640,387, Dec. 12, 1975, abandoned.

[30] Foreign Application Priority Data

Dec. 13, 1974 [JP] Japan ........................... 49-143737

[51] Int. Cl.$^2$ .................... C08F 2/44; C08F 2/02; C08F 20/18

[52] U.S. Cl. .................................. 526/193; 525/242; 525/296; 525/309; 525/310; 526/209; 526/210; 526/214; 526/220; 526/222; 526/225; 526/303; 526/307; 526/317; 526/323.1; 526/327; 526/329.7

[58] Field of Search ................ 260/79.5 C; 526/193, 526/222, 209, 214, 210

[56] References Cited

U.S. PATENT DOCUMENTS

| | | | |
|---|---|---|---|
| 2,227,517 | 1/1941 | Starkweather | 526/223 |
| 2,234,204 | 3/1941 | Starkweather | 526/223 |
| 2,385,739 | 9/1945 | Starkweather | 526/223 |
| 2,396,997 | 3/1946 | Fryling | 526/223 |
| 3,772,258 | 11/1973 | Lachowicz | 526/223 |

FOREIGN PATENT DOCUMENTS 147457  7/1952  Australia ........................ 526/223

Primary Examiner—C. A. Henderson
Attorney, Agent, or Firm—Birch, Stewart, Kolasch and Birch

[57] ABSTRACT

In a process for producing a casting plate of polymethyl methacrylate by continuously subjecting a methyl methacrylate monomer or a syrup containing soluble polymeric resins in the methyl methacrylate monomer to casting polymerization, an improvement which comprises adding a sulfur-containing compound represented by the formula:

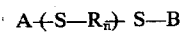

$$A\text{---}(S\text{---}R_n)\text{---}S\text{---}B$$

wherein n is an integer of 0 to 10, R is an alkylene group having 1 to 6 carbon atoms and A and B are the same or different and are each a —(CH$_2$)$_m$—CH(XY) group in which m is an integer of 0 to 23, X is a hydrogen atom, a halogen atom or a methyl group and Y is a hydrogen atom, a cyano group, a —OCOCH$_3$ group, a —COOR' group or a —COSR" group, R' and R" being each an alkyl group having 1 to 24 carbon atoms, and a surfactant to the starting monomer or syrup to obtain the casting plate having an improved thermal stability.

3 Claims, No Drawings

PROCESS FOR PRODUCING A CASTING PLATE OF POLYMETHYL METHACRYLATE

This application is a continuation of copending application Ser. No. 640,387, filed on Dec. 12, 1975, now abandoned.

BACKGROUND OF THE INVENTION

The present invention relates to a process for continuously casting a plate of polymethyl methacrylate. More particularly, it relates to an improved process for producing a cast plate of polymethyl methacrylate having an excellent thermal stability by continuous casting polymerization.

In general, a polymethyl methacrylate plate is superior in various properties, for example, flatness of surface, appearances such as transparency or color, mechanical properties, thermal properties, resistance to weathering and the like. Therefore, the plate is now in a wide use as a thermoplastic resin plate.

However, a polymethyl methacrylate plate produced by continuous casting polymerization of methyl methacrylate which has been developed in a recent year and attains a high productivity with a high speed is inferior in the thermal stability to a plate of polymethyl methacrylate produced by cell casting which has been widely adopted in commercial purpose, when exposed to relatively high temperatures (i.e. about 200° C.), for example, on molding or fabricating. Thus, the polymer of methyl methacrylate once produced by continuous casting polymerization partially decomposes, and the resulting degradation monomers and low molecular compounds foam in the molded or fabricated products to impart a remarkable damage in the appearance of the products or to decrease the thermal and mechanical properties of the products. Therefore, a range of applicable temperatures for molding or fabricating the plate disadvantageously becomes narrow.

Various methods for preventing the said decomposition by heat have been proposed. One of the typical methods is the incorporation of a stabilizer such as a decomposition-inhibitor. As the stabilizer, amine compounds and phenol compounds are well known. However, these stabilizers can hardly be used in case of the polymer of methyl methacrylate having excellent optical properties, because the polymer incorporated with them is colored on heating and deteriorated in weatherability, transparency and color. Another typical method is the incorporation of sulfur-containing compounds as a thermal stabilizer [cf. Japanese Patent Publication Nos. 13383/1968 and 35977/1971], if necessary, with phenol compounds [cf. Japanese Patent Publication Nos. 1498/1968 and 7629/1972]. But, a satisfactory result has not yet been obtained.

SUMMARY OF THE INVENTION

As the result of the extensive study, there has now been completed a process for continuously casting a plate of polymethyl methacrylate which has an excellent thermal stability and particularly never foams and is never colored even when heated.

According to the present invention, a methyl methacrylate monomer or a syrup containing soluble polymeric resins in the methyl methacrylate monomer is subjected to continuous casting polymerization in the presence of a sulfur-containing compound as a stabilizer and a surfactant to give a casting plate having an excellent thermal stability and particularly being suitable for molding or fabricating without foaming on heating.

In the process of the invention, a characteristic interaction between the sulfur-containing compound as a stabilizer and the surfactant acts very effectively on improvement of the thermal stability of the casting plate without giving any deterioration to the weatherability, transparency or color of the plate.

The term "methyl methacrylate monomer" herein used is intended to mean not only monomeric methyl methacrylate itself but also its mixture with any other monomeric compound(s) such as acrylic acid, methacrylic acid, alkyl acrylate, alkyl methacrylate, acrylonitrile, methacrylonitrile, styrene and its alkylated or halogenated derivatives (e.g. α-methylstyrene), acrylamide, methacrylamide and N-substituted unsaturated amides, provided that the content of the monomeric methyl methacrylate in the mixture is not less than about 50% by weight. The polymeric resins contained in the syrup may be, for instance, homopolymers or copolymers of methyl methacrylate and/or the other monomeric compound(s).

For continuous casting polymerization of the starting monomer or syrup, a conventional continuous casting process, for instance, using a pair of upper and lower endless belts may be adopted.

In the continuous casting process using endless belts which requires a very large amount of equipment investment, a high productivity is required as the depreciation amount becomes high. For this reason, the productivity is usually enhanced by increasing the amount of a radical polymerization initiator to be added to the starting monomer or syrup, thus accelerating the rate of polymerization and shortening the period of time for the polymerization. But, a satisfactory casting plate can difficultly be obtained in terms of the foaming property on heating. In the present invention, a casting plate of polymethyl methacrylate which has various excellent physical and mechanical properties, for instance, an extremely low tendency of foaming on heating, can be produced very easily by a continuous casting process with an economically satisfactory productivity.

As a polymerization initiator which may be employed in the present invention, there are exemplified azo compounds such as azobis(isobutyronitrile) and azobis-2,4-(dimethylvaleronitrile) and organic peroxides such as benzoyl peroxide and lauroyl peroxide. Since the sulfur-containing compound used as the stabilizer in the invention may act to decompose the peroxides as the polymerization initiator and tend to reduce the efficiency of the peroxides, the use of the azo compounds is usually recommended.

In the present invention, one or more sulfur-containing compounds as the stabilizer are incorporated into the starting monomer or syrup. The amount of the stabilizer may be from about 0.005 to 5% by weight, preferably from about 0.05 to 1.0% by weight based on the produced polymer. One or more surfactants are also incorporated into the starting monomer or syrup. The amount of the surfactant may be from about 0.0001 to 1% by weight, preferably from about 0.005 to 0.1% by weight based on the produced polymer.

The sulfur-containing compound used as the stabilizer can be represented by the following formula:

wherein n is an integer of 0 to 10 (preferably of 0 to 2), R is an alkylene group having 1 to 6 carbon atoms (preferably having 1 to 4 carbon atoms), and A and B are the same or diffrent and are each a —(CH$_2$)$_m$—CH(XY) group in which m is an integer of 0 to 23 (preferably of 1 to 12), X is a hydrogen atom, a halogen atom (preferably a chlorine atom) or a methyl group and Y is a hydrogen atom, a cyano group, a —OCOCH$_3$ group, —COOR' group or a —COSR" group, R' and R" being each an alkyl group having 1 to 24 carbon atoms (preferably having 8 to 18 carbon atoms).

Specific examples of R include methylene, ethylene, propylene, etc. As R' and R", there may be exemplified methyl, ethyl, propyl, butyl, pentyl, hexyl, heptyl, octyl, nonyl, decyl, undecyl, dodecyl, tetradecyl, pentadecyl, hexadecyl, heptadecyl, octadecyl, etc.

Spesific examples of the sulfur-containing compound are dioctyl sulfide, 1,3-di-n-dodecylthiopropane, ethyl dodecyl thiopropionate, methyl dodecyl thioisobutyrate, dilauryl thiodipropionate, distearyl thiodipropionate, lauryl stearyl thiodipropionate, dibutyl thiodiundecathiolate, dioctyl thiodiundecathiolate, etc. Most preferred are dioctyl sulfide, dilauryl thiodipropionate, distearyl thiodipropionate and lauryl stearyl thiodipropionate.

As the surfactant, there may be used any anionic or nonionic surfactant which is well compatible with monomeric methyl methacrylate and its polymer and does not reduce the transparency of the resulting polymer casting plate. Examples of the anionic surfactant include sodium alkylsulfate (e.g. sodium octylsulfate, sodium laurylsulfate, sodium stearylsulfate), sodium alkylbenzenesulfonate (e.g. sodium dodecylbenzenesulfonate), sodium alkylsulfonate (e.g. sodium laurylsulfonate, sodium cetylsulfonate, sodium stearylsulfonate), sodium dialkylsulfosuccinate (e.g. sodium dioctylsulfosuccinate), etc. Examples of the nonionic surfactant include polyethyleneglycol alkyl ether (e.g. polyethyleneglycol oleyl ether, polyethyleneglycol stearyl ether, polyethyleneglycol lauryl ether), polyethyleneglycol alkylphenyl ether (e.g. polyethyleneglycol nonylphenyl ether, polyethyleneglycol octylphenyl ether, polyethyleneglycol dodecylphenyl ether), higher fatty acid ester of polyethyleneglycol (e.g. oleic acid ester of polyethyleneglycol, stearic acid ester of polyethyleneglycol, lauric acid ester of polyethyleneglycol), polyethyleneglycol polypropyleneglycol ether, sorbitan fatty acid ester (e.g. sorbitan monolaurate, sorbitan monostearate, sorbitan monooleate), polyethyleneglycol sorbitan fatty acid ester (e.g. polyethyleneglycol sorbitan monolauric acid ester, polyethyleneglycol sorbitan monostearic acid ester, polyethyleneglycol sorbitan monooleic acid ester), phosphoric acid ester of polyethyleneglycol, phosphoric acid ester of alkylpolyethyleneglycol (e.g. phosphoric acid ester of lauryloxypolyethyleneglycol, phosphoric acid diester of lauryloxypolyethyleneglycol, phosphoric acid ester of dodecylphenoxypolyethyleneglycol), etc. Most preferred are sodium dialkylsulfosuccinate, polyethyleneglycol alkyl ether, polyethyleneglycol alkylphenyl ether, higher fatty acid ester of polyethyleneglycol and phosphoric acid ester of polyethyleneglycol.

In addition to the stabilizer and the surfactant as stated above, a cross-linking agent may be also incorporated for enhancing the thermal stability. Examples of the cross-linking agent are ethylene glycol dimethacrylate, ethyleneglycol diacrylate, polyethyleneglycol dimethacrylate, allyl methacrylate, etc. Moreover, coloring agents, ultraviolet absorbers, plasticizers, glass fibers and/or any other appropriate additives may be incorporated when desired.

As mentioned above, in the improvement of the thermal stability of the continuous casting plate of polymethyl methacrylate according to the present invention, the characteristic interactions between the sulfur-containing compound as the stabilizer and the surfactant improves the thermal stability of the polymer very easily and remarkably without deterioration of the excellent weathering resistance, transparency and color of the polymer. Additionally, the continuous casting plate thus obtained does not receive the damage in appearance due to the foaming at heat-forming, and can be fabricated very rapidly under an economical condition.

DETAILED DESCRIPTION OF THE INVENTION

The present invention will be illustrated in more details with reference to the following examples, which are only given for the purpose of illustration, and can properly be modified within the scope of the present invention. All parts and percentages in the examples are by weight unless otherwise stated.

EXAMPLE 1

In 100 parts of a methyl methacrylate syrup prepared by dissolving polymethyl methacrylate (reduced viscosity determined on the chloroform solution (0.1 g/100 ml) at 25° C., 0.65 dl/g) in methyl methacrylate in 15% concentration were dissolved 0.06 part of azobis(2,4-dimethylvaleronitrile) as an initiator, 0.10 part of dilauryl thiodipropionate as a stabilizer and 0.01 part of sodium dioctylsulfosuccinate as a surfactant. The resulting solution was deaerated under reduced pressure. As a continuous casting apparatus, two endless, mirror-polished stainless steel belts of 0.6 mm in thickness and 500 mm in width were arranged up and down (a longitudinal distance of the space formed between the upper and lower belt surfaces being 10,000 mm) and adjusted to obtain a casting plate of 3 mm in thickness. Then, the deaerated methyl methacrylate syrup containing the additives was continuously poured into the apparatus and polymerized by heating with hot water of 85° C. After the generation of polymerization heat passed over the peak, the polymer was treated with hot-air of 120° C. for 10 minutes and then cooled to room temperature to give a continuous casting plate of a colorless, transparent and foamless methyl methacrylate polymer (reduced viscosity determined on the chloroform solution (0.1 g/100 ml) at 25° C., 2.8 dl/g).

The thermal stability of the casting plate was tested by measuring the temperature, using a hot-air circulation type oven, at which the casting plate began to foam when heated for 30 minutes, and the result is shown in Table 1, wherein the thermal stabilities of the casting plates prepared in the same manner as above but using no surfactant (Reference Example 1), no stabilizer (Reference Example 2) and no surfactant and stabilizer (Reference Example 3) are also shown.

Table 1

|  | Example 1 | Reference Example 1 | Reference Example 2 | Reference Example 3 |
|---|---|---|---|---|
| Foaming temperature (°C.) | 205 | 190 | 175 | 175 |

From the above Table, it can be seen that the thermal stability of the casting plate of methyl methacrylate polymer is extremely improved by using the stabilizer and the surfactant in combination.

EXAMPLE 2

In 100 parts of the methyl methacrylate syrup as used in Example 1 were dissolved azobisisobutyronitrile as an initiator, dilauryl thiodipropionate as a stabilizer and sodium dioctylsulfosuccinate as a surfactant in amounts as indicated in Table 2, and the resulting mixture was deaerated. The deaerated methyl methacrylate syrup was poured into the continuous casting apparatus, polymerized, heat-treated and cooled to room temperature as in Example 1 to give a continuous casting plate of colorless, transparent and foamless methyl methacrylate polymer.

With respect to the casting plate as prepared above, the maximum amount of the initiator at which the casting plate did not foam when heated at 200° C. for 30 minutes in a hot-air circulation type oven was determined, and the result is shown in Table 2. The period of time from the beginning of heating (85° C.) of the poured syrup to the peak of generation of polymerization heat is also shown in Table 2. The peak is due to the gel effect encountered in the polymerization of methyl methacrylate and serves as a guide to completion of the polymerization.

Likewise, the maximum amount of the initiator was determined on the casting plates prepared in the same manner as above except using no surfactant (Reference Example 4), no stabilizer (Reference Example 5) and neither surfactant nor stabilizer (Reference Example 6), and the results are shown in Table 2 together with the period of time from the beginning of heating to the peak of heat generation.

Table 2

| | Azobis-isobutyro-nitrile (part) | Dilauryl thio-di-propio-nate (part) | Sodium dioctyl-sulfo-succinate (part) | Time elapsed to the peak of heat-genera-tion (min) |
|---|---|---|---|---|
| Example 2 | 0.10 | 0.1 | 0.01 | 27 |
| Reference 4 | 0.08 | 0.1 | — | 30 |
| Example 5 | 0.05 | — | 0.01 | 35 |
| 6 | 0.05 | — | — | 35 |

From Table 2, it can be seen that the combined use of the stabilizer and the surfactant extremely improves the foaming-preventing effect and enables an increase in the amount of the initiator used for the polymerization of methyl methacrylate. Thus, the period of time for the polymerization of methyl methacrylate can be shortened, and the productivity of the casting plates of methyl methacrylate polymer can be easily improved.

EXAMPLE 3

A continuous casting plate of polymethyl methacrylate was obtained in the same manner as in Example 1 except using 0.1 part of dioctylsulfide as the stabilizer. The lowest temperature at which the plate began to foam when heated for 30 minutes was 200° C. On the other hand, the lowest foaming temperature of the plate obtained in the same manner as above except using no surfactant was 185° C.

EXAMPLE 4

A continuous casting plate of polymethyl methacrylate was obtained in the same manner as in Example 1 except using 0.1 part of distearyl thiodipripionate as the stabilizer and 0.01 part of polyethyleneglycol dodecylphenyl ether as the surfactant. The lowest temperature at which the plate began to foam when heated for 30 minutes was 205° C. For comparison, the casting plates were obtained in the same manner as in Example 4 but using no surfactant or no stabilizer. The lowest foaming temperatures of them were 190° C. and 175° C., respectively.

EXAMPLE 5

One thousand parts of methyl methacrylate were charged in a polymerization vessel equipped with a reflux condenser and heated to the boiling point, and then 0.5 part of azobis-(2,4-dimethyl-valeronitrile) was added thereto. The monomer was polymerized for 10 minutes and then cooled to 30° C. to obtain a syrup (polymerization percentage, 19.5%; viscosity, 8.5 poise at 25° C.).

A continuous casting plate of polymethyl methacrylate was obtained by using the resulting syrup as in Example 1, except that 0.05 part of phosphoric acid ester of laurylpolyethyleneglycol was used as the surfactant. The lowest temperature at which the plate began to foam when heated for 30 minutes was 200° C. On the other hand, the casting plate obtained in the same manner as above except using no stabilizer showed the lowest foaming temperature of 170° C.

What is claimed is:

1. In a process for producing a casting plate of polymethyl methacrylate by continuously subjecting a methyl methacrylate monomer or a syrup containing soluble polymeric resins in the methyl methacrylate monomer incorporated with a sulfur-containing compound selected from the group consisting of dioctyl sulfide, 1,3-di-n-dodecylthiopropane, ethyl dodecyl thiopropionate, methyl dodecyl thioisobutyrate, dilauryl thiodipropionate, distearyl thiodipropionate, lauryl stearyl thiodipropionate, dibutyl thiodiundecathiolate and dioctyl thiodiundecathiolate, in an amount of 0.005 to 5% by weight based on the produced polymer, to casting polymerization, the improvement which consists essentially of adding a surfactant selected from the group consisting of an anionic or nonionic surfactant to the starting mixture comprising the monomer or syrup incorporated with the sulfur-containing compound in an amount of 0.0001 to 1% by weight based on the produced polymer to obtain the casting plate having an improved thermal stability.

2. The process as claimed in claim 1, wherein the surfactant is an anionic surfactant selected from the group consisting of sodium alkylbenzenesulfonate, sodium alkylsulfonate and sodium dialkylsulfosuccinate.

3. The process as claimed in claim 1, wherein the surfactant is a nonionic surfactant selected from the group consisting of polyethyleneglycol alkyl ether, polyethyleneglycol alkylphenyl ether, higher fatty acid ester of polyethyleneglycol, polyethyleneglycol polypropyleneglycol ether, sorbitan fatty acid ester, polyethyleneglycol sorbitan fatty acid ester, phosphoric acid ester of polyethyleneglycol and phosphoric acid ester of alkylpolyethyleneglycol.

* * * * *